(12) United States Patent
Guo

(10) Patent No.: US 12,501,627 B2
(45) Date of Patent: Dec. 16, 2025

(54) RRAM CELL STRUCTURE AND FABRICATION METHOD THEREFOR

(71) Applicants: SHANGHAI INTEGRATED CIRCUIT EQUIPMENT & MATERIALS INDUSTRY INNOVATION CENTER CO., LTD., Shanghai (CN); SHANGHAI IC R&D CENTER CO., LTD., Shanghai (CN)

(72) Inventor: Ao Guo, Shanghai (CN)

(73) Assignees: SHANGHAI INTEGRATED CIRCUIT EQUIPMENT & MATERIALS INDUSTRY INNOVATION CENTER CO., LTD., Shanghai (CN); SHANGHAI IC R&D CENTER CO., LTD., Shanghai (CN)

( * ) Notice: Subject to any disclaimer, the term of this patent is extended or adjusted under 35 U.S.C. 154(b) by 551 days.

(21) Appl. No.: 17/786,523

(22) PCT Filed: Jul. 23, 2020

(86) PCT No.: PCT/CN2020/103755
§ 371 (c)(1),
(2) Date: Jun. 16, 2022

(87) PCT Pub. No.: WO2021/120621
PCT Pub. Date: Jun. 24, 2021

(65) Prior Publication Data
US 2023/0033747 A1 Feb. 2, 2023

(30) Foreign Application Priority Data
Dec. 18, 2019 (CN) .......................... 201911306582.5

(51) Int. Cl.
*H10B 63/00* (2023.01)
*H10N 70/00* (2023.01)

(52) U.S. Cl.
CPC ............ *H10B 63/34* (2023.02); *H10N 70/011* (2023.02)

(58) Field of Classification Search
CPC ...... H10B 63/34; H10N 70/011; H10N 70/20; H10N 70/826; H10N 70/8833;
(Continued)

(56) References Cited

U.S. PATENT DOCUMENTS

| 6,337,497 B1* | 1/2002 | Hanafi .................... H10B 12/31 345/182 |
| 7,276,754 B2* | 10/2007 | Bissey .................... H10D 30/63 257/E21.612 |
| 2009/0189217 A1* | 7/2009 | Yoon .................... H10D 30/025 257/329 |

FOREIGN PATENT DOCUMENTS

| CN | 101388407 A1 | 3/2009 |
| CN | 102428562 A1 | 4/2012 |
| CN | 110111827 A1 | 8/2019 |

* cited by examiner

*Primary Examiner* — David Vu
(74) *Attorney, Agent, or Firm* — Bayramoglu Law Offices

(57) ABSTRACT

The present invention disclosures a RRAM cell structure, comprising a first transistor and a second transistor which are connected in parallel and commonly connected to a resistive switching device; wherein, the first transistor is set with a first gate, a first source and a first drain, a first control signal is applied to the first gate, and a first source signal is applied to the first source; the second transistor is set with a second gate, a second source and a second drain, a second control signal is applied to the second gate, and a second source signal is applied to the second source; the first drain is connected with the second drain, which are commonly connected to one terminal of the resistive switching device, and a bit signal is applied to another terminal of the resistive switching device. The present invention uses cell area of a traditional 1T1R to manufacture a 2T1R cell structure, (Continued)

which can take into account various operating voltage requirements of the resistive switching device simultaneously, so as to significantly improve cell performances thereof.

7 Claims, 4 Drawing Sheets

(58) Field of Classification Search
CPC ............ G11C 13/0026; G11C 13/0028; G11C 2013/0083; G11C 2213/15; G11C 13/003; G11C 13/004; G11C 13/0069; G11C 13/0007; G11C 2013/0071; G11C 2213/74; G11C 2213/79; H10D 84/0181; H10D 84/038

See application file for complete search history.

--prior art--

--prior art--

--prior art--

RRAM CELL STRUCTURE AND FABRICATION METHOD THEREFOR

CROSS-REFERENCE TO RELATED APPLICATION

This application claims priority of International Patent Application Serial No. PCT/CN2020/103755, filed Jul. 23, 2020, which is related to and claims priority of Chinese Patent Application Serial No. CN201911306582.5, filed Dec. 18, 2019. The entirety of each of the above-mentioned patent applications is hereby incorporated herein by reference and made a part of this specification.

TECHNICAL FIELD

The disclosure relates to the technical field of memory, in particular to a novel RRAM cell structure and a fabrication method therefor.

BACKGROUND

RRAM (Resistive Random Access Memory) is a new kind of non-volatile memory, which has advantages of high speed, low power consumption, non-volatility, high integration and compatibility with CMOS technology. In recent years, it has become one of research hotspots in technical field of novel memory, even commercial products are available.

The cell structure of the RRAM is a core of RRAM technology, based on a RRAM cell, a RRAM array can be constructed and a RRAM chip can be realized.

At present, a mainstream RRAM cell structure is usually a 1T1R structure, and its typical schematic diagram is shown in FIG. 1-2. that is, a transistor (T) and a resistive switching device (R) are connected in series to form an RRAM cell. Wherein, the transistor is usually a planar MOS transistor, which can be formed by a CMOS front-end process; then, a resistive switching stack of a resistive switching device can be integrated through back-end metal layers, so as to form a 1T1R cell.

The basic working principle of the traditional 1T1R cell is as follows: providing a control signal Vg to the gate of the transistor to control gating of the resistive switching device, the drain of the transistor is connected to the resistive switching device, providing a bit signal Vbit to the output terminal of the resistive switching device, and providing a source signal Vs to the source of the transistor, through different timing combinations of Vg, Vbit and Vs, various operations of the resistive switching device are realized, comprising forming, data set/reset and data read, etc.

Obviously, the transistor of the traditional 1T1R cell structure must meet different voltage requirements of each of the various operations, at present, limited by shortcomings of existing resistance switching materials and manufacturing processes, the voltage span of the various operations of the resistance switching cell is large. As shown in exemplary results shown in FIG. 3, an initialization voltage is as high as 4V or more, but a reset voltage is only about 1.3V, the wide range of the voltage span makes the transistor of the existing 1T1R cell structure have to sacrifice cell performances for device reliability, on the other hand, addition of a control transistor will inevitably lead to a significant increase in cell area, which is not conducive to high-density integration of a RRAM memory.

Therefore, optimization of the RRAM cell structure has become an important exploration direction for improving the performances of the RRAM cell, and it is also one of key technologies that urgently need to be solved to promote industrial application of RRAM technology.

SUMMARY

The purpose of the present invention is to overcome the above-mentioned shortcomings in the prior art and adopts a novel RRAM cell structure and a fabrication method therefor. A 2T1R cell structure is prepared by utilizing area of a traditional 1T1R cell, which can simultaneously take into account various operating voltage requirements of a RRAM cell, thus cell performances thereof can be significantly improved.

In order to achieve the above objective, the present invention adopts a RRAM cell structure, comprising a first transistor and a second transistor which are connected in parallel, and a resistive switching device connected with the first transistor and the second transistor commonly; wherein, the first transistor is set with a first gate, a first source and a first drain, a first control signal is applied to the first gate, and a first source signal is applied to the first source; the second transistor is set with a second gate, a second source and a second drain, a second control signal is applied to the second gate, and a second source signal is applied to the second source; the first drain is connected with the second drain, which are commonly connected to one terminal of the resistive switching device, and a bit signal is applied to another terminal of the resistive switching device.

Further, the RRAM cell structure is set on a semiconductor substrate, a raised cuboid is set on the surface of the semiconductor substrate, the first drain and the second drain are set on the top surface of the raised cuboid, the first gate and the second gate are respectively set on the two sidewalls of the raised cuboid, and the first source and the second source are respectively set on the semiconductor substrate adjacent to the two sides of the raised cuboid, a first gate dielectric layer and a second gate dielectric layer are respectively set to separate the first gate and the second gate from the semiconductor substrate; the first transistor is set with a first channel, the second transistor is set with a second channel, the first channel and the second channel are commonly set in the raised cuboid to respectively form a vertical channel structure; a dielectric layer is set on the surface of the semiconductor substrate, and the resistive switching device is set in the dielectric layer.

Further, the first transistor and the second transistor in layout is equivalent to a planar MOS transistor; wherein, the first source and the second source in layout is equivalent to the source and drain of the planar MOS transistor, and the first drain and the second drain in layout is equivalent to the gate of the planar MOS transistor, the first gate and the second gate are corresponding to the two gate sidewalls of the planar MOS transistor.

Further, the first transistor and the second transistor in layout is equivalent to a planar MOS transistor; wherein, the first source and the second source in layout is equivalent to the source and drain of the planar MOS transistor, and the first drain and the second drain in layout is equivalent to the gate of the planar MOS transistor, the first gate and the second gate are corresponding to the two gate sidewalls of the planar MOS transistor.

Further, the resistive switching device is a resistive switching stack, which comprises a top electrode, a resistive switching layer and a bottom electrode in sequence, the first drain and the second drain are connected to the bottom electrode of the resistive switching device through a contact hole set in the dielectric layer, and the bit signal is applied to the top electrode of the resistive switching device.

Further, the thicknesses of the first gate dielectric layer and the second gate dielectric layer are different, the types and doses of the first transistor and the second transistor are different.

Further, the first transistor is used for the forming operation of the RRAM cell, and the second transistor is used for the data set/reset/read operations of the RRAM cell; or, the first transistor is used for the forming/set operations of the RRAM cell, and the second transistor is used for the data reset/read operations of the RRAM cell; or, the first transistor is used for the forming/reset operations of the RRAM cell, and the second transistor is used for the data set/read operations of the RRAM cell.

In order to achieve the above objective, the present invention adopts a fabrication method for a RRAM cell structure, comprising: S1: providing a planar silicon substrate, defining a device region of a first transistor and a second transistor on the silicon substrate, and forming a raised cuboid on the silicon substrate in the device region; S2: forming the first drain of the first transistor and the second drain of the second transistor on the top surface of the raised cuboid, connecting the first drain and the second drain, and forming the first source of the first transistor and the second source of the second transistor respectively on the semiconductor substrate adjacent to the two sides of the raised cuboid; S3: forming the first gate dielectric layer of the first transistor and the second gate dielectric layer of the second transistor respectively on each of the two sides of the raised cuboid and the surface of the semiconductor substrate adjacent to the two sides of the raised cuboid; S4: forming a first sidewall gate of the first transistor and a second sidewall gate of the second transistor respectively on the first gate dielectric layer and the second gate dielectric layer on each of the two sides of the raised cuboid; S5: forming a dielectric layer on the silicon substrate, forming back-end metal layers in the dielectric layer, and forming a resistive switching stack of a resistive switching device above the first drain and the second drain, thus forming the RRAM cell structure.

Further, using a standard ion implantation process in CMOS technique, performing ion implantation processes with different types and doses to the first drain and the second drain, the first source and the second source and the first gate and the second gate respectively.

Further, forming the first gate dielectric layer and the second gate dielectric layer comprises: S31: forming a thick gate dielectric layer on the top surface and both sides of the raised cuboid and on the surface of the semiconductor substrate adjacent to the two sides of the raised cuboid; S32: removing the thick gate dielectric layer on the second transistor; S33: forming a thin gate dielectric layer on the top surface and both sides of the raised cuboid and on the surface of the semiconductor substrate adjacent to the two sides of the raised cuboid.

Further, in S4: using a standard self-aligned sidewall process in CMOS technique comprising a gate material deposition process and a sidewall etching process to form the first gate and the second gate.

The advantages of the present invention are that the 2T1R RRAM cell structure proposed by the present invention comprises two parallel-connected transistors (the first transistor and the second transistor) and a resistive switching device, the two transistors can have different electrical characteristics. In order to gate different transistors according to different operating voltage requirements, the defect of large voltage span between various operating modes of the traditional 1T1R cell is effectively overcome, and the performances of the resistive memory cell is significantly improved. At the same time, the fabrication method for the 2T1R cell structure of the present invention is completely based on a standard CMOS process and a mainstream RRAM process technology. The two transistors are realized by two vertical channel transistors with sidewall gates, and the cell area in layout is equivalent to the traditional 1T1R cell. Therefore, the outstanding advantage of the present invention is embodied on the basis of not increasing the cell area, and realizes the optimization and improvement of the performances of the resistive random access cell, and the process realization method is compatible with the existing standard process, which is very suitable for future large-scale RRAM arrays and chips. Realization is a new type of RRAM technology with very promising applications.

DETAILED DESCRIPTION

The content of the present invention will be further described in detail below in conjunction with the accompanying drawings of the specification. It should be understood that the present invention can have various changes in different examples, which do not depart from the scope of the present invention, and the descriptions and diagrams therein are essentially for illustrative purposes, rather than limiting the present invention. It should be noted that the drawings all adopt a very simplified form and all use imprecise ratios, which are only used to conveniently and clearly assist in explaining the purpose of the embodiments of the present invention.

Figure 4:
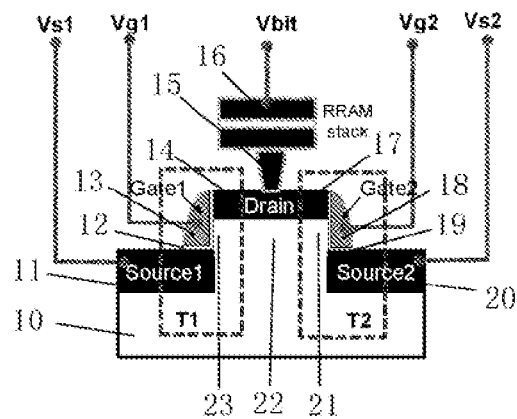
FIG. 4 is a schematic diagram of a device structure of a RRAM cell according to a preferred embodiment of the present invention.
Figure 5:
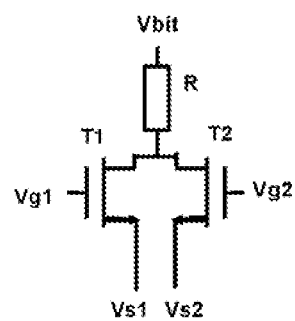
FIG. 5 is a schematic diagram of the equivalent circuit structure of the RRAM cell in FIG. 4.

In following specific embodiments of the present invention, please refer to FIG. 4-5, FIG. 4 is a schematic diagram of a device structure of a RRAM cell according to a preferred embodiment of the present invention, and FIG. 5 is a schematic diagram of the equivalent circuit structure of the RRAM cell in FIG. 4. As shown in FIG. 4-5, a RRAM cell structure, comprising a first transistor T1 and a second transistor T2 which are connected in parallel, and a resistive switching device (R) 16 connected with the first transistor and the second transistor commonly.

Please refer to FIG. 4-5. The first transistor T1 is set with a first gate (Gate 1) 13, a first source (Source 1) 11 and a first drain (Drain) 14. Wherein, a first control signal Vg1 is applied to the first gate 13, and a first source signal Vs1 is applied to the first source 11.

The second transistor T2 is set with a second gate (Gate 2) 18, a second source (Source 2) 20 and a second drain (Drain) 17. Wherein, a second control signal Vg2 is applied to the second gate 18, and a second source signal Vs2 is applied to the second source 20.

The first drain 14 and the second drain 17 are commonly connected to one terminal of the resistive switching device 16, and a bit signal Vbit is applied to another terminal of the resistive switching device 16. The first transistor T1 and the second transistor T2 are connected by connecting the first drain 14 and the second drain 17, thus a parallel structure is formed.

Please refer to FIG. 4. The RRAM cell structure can be set on a semiconductor substrate, such as a silicon substrate 10. a raised cuboid 22 is set on the surface of the silicon substrate 10, and the raised cuboid 22 is an extended structure on the surface of the silicon substrate 10. The first drain 14 and the second drain 17 are juxtaposed on the top surface of the raised cuboid 22. The first gate 13 and the second gate 18 are respectively set on each of the two sidewalls of the raised cuboid 22. A first gate dielectric layer 12 and a second gate dielectric layer 19 are respectively set to separate the first gate 13 and the second gate 18 from the silicon substrate 10 (comprising the raised cuboid 22). The first source 11 and the second source 20 are respectively set on the silicon substrate 10 on each of the two sides of the raised cuboid 22.

The first transistor T1 is set with a first channel 23, the second transistor T2 is set with a second channel 21, and the first channel 23 and the second channel 21 are commonly set in the raised cuboid 22 to respectively form a vertical channel structure, thus the first transistor T1 and the second transistor T2 are formed to be a vertical channel transistor. The gates (the first gate 13 and the second gate 18) of the vertical channel transistor are a sidewall structure, the sources and the drains (the first source 11 and the first drain 14, the second source 20 and the second drain 17) of the vertical channel transistor are a top and bottom asymmetric structure, the drains are on the top, the sources are on the bottom, through controlling of sidewall gates, vertical conductive channels (the first channel 23 and the second channel 21) are formed, the two transistors T1 and T2 share a common drain (the first drain 14 and the second drain 17), and the common drain is connected to the resistive switching device 16 through a back-end interconnection process.

Please refer to FIG. 4. A dielectric layer (not shown in the figure) can be set on the surface of the silicon substrate 10; a resistive switching device 16 is set in the dielectric layer. The resistive switching device 16 can be a resistive switching stack; the resistive switching stack comprises a top electrode, a resistive switching layer and a bottom electrode in sequence. The first drain 14 and the second drain 17 are commonly connected to the bottom electrode of the resistive switching device 16 through a contact hole 15 set in the dielectric layer, and the bit signal Vbit is applied to the top electrode of the resistive switching device 16.

Figure 1:
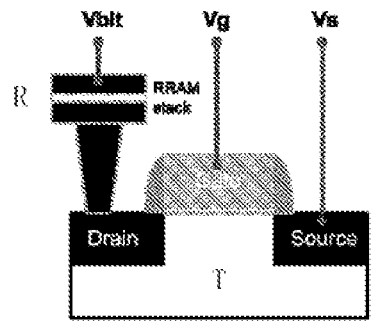
FIG. 1 is a schematic diagram of a device structure of an existing 1T1R RRAM cell.
Figure 2:
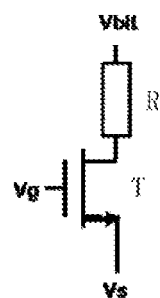
FIG. 2 is a schematic diagram of the equivalent circuit structure of the RRAM cell in FIG. 1.
Figure 3:
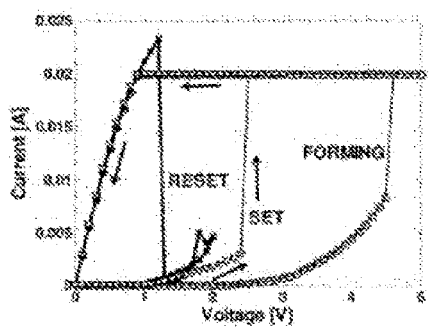
FIG. 3 is a schematic diagram showing examples of different operating voltages of an existing 1T1R RRAM cell.

Please refer to FIG. 4. the first transistor T1 and the second transistor T2 in layout is equivalent to a conventional planar MOS transistor. Wherein, the first source 11 and the second source 20 in layout is equivalent to the source and drain of the planar MOS transistor, and the first drain 14 and the second drain 17 in layout is equivalent to the gate of the planar MOS transistor, the first gate 13 and the second gate 18 are corresponding to the two gate sidewalls of the planar MOS transistor, and can be formed by a self-aligned sidewall process without increasing layout areas thereof. That is, the two vertical channel transistors T1 and T2 in layout is actually equivalent to the traditional planar transistor T as shown in FIG. 1, it can be seen that a prominent advantage of a 2T1R cell structure proposed by the present invention is that cell area thereof is not increased compared to a traditional 1T1R structure.

Meanwhile, the 2T1R cell structure proposed by the present invention also has another significant feature, that is, the two transistors T1 and T2 have different voltage turn-on characteristics. Specifically, if the first transistor T1 is a high-voltage turn-on transistor, the second transistor T2 can be a low-voltage turn-on transistor; conversely, if the first transistor T1 is a low-voltage turn-on transistor, the second transistor T2 can be a high-voltage turn-on transistor. Such different voltage conduction characteristics can be realized through different gate dielectric thicknesses and different types of implanted impurities and doses. For example, the thicknesses of the first gate dielectric layer 12 and the second gate dielectric layer 19 are different; and, the first drain 14, the first source 11 and the first gate 13 of the first transistor T1 and the second drain 17, the second source 20 and the second gate 18 of the corresponding transistor T2 have different types of implanted impurities and doses.

The different electrical characteristics of the above two transistors provide great convenience to operation modes of the 2T1R cell structure. The two transistors T1 and T2 can respectively control different operation modes of the 2T1R cell structure, that is, T1 and T2 are not turn on simultaneously in a certain operation mode.

Figure 6:
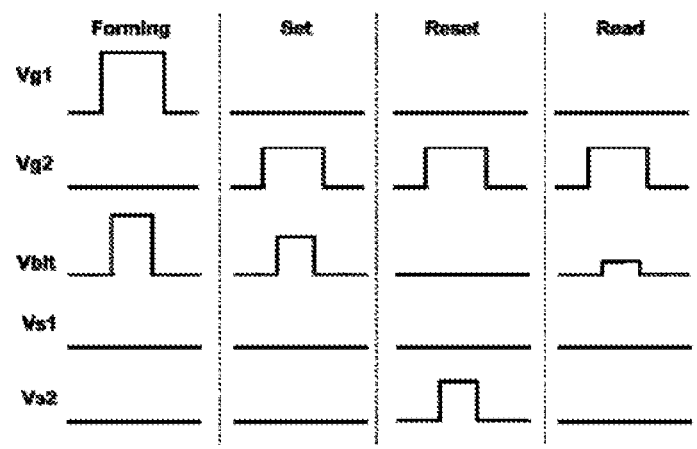
FIG. 6 is a schematic diagram of an operation mode of a RRAM cell according to a preferred embodiment of the present invention.

Please refer to FIG. 6. As an embodiment of an operation mode, by turning on the first transistor T1, so as to realize the forming operation of the RRAM cell, and by turning on the second transistor 12, so as to realize the data set/reset/read operations of the RRAM cell. By combining different transistors, it effectively solves a problem of high initial voltage of an existing RRAM cell For different operating voltage requirements of different operating modes, the 2T1R cell structure of the present invention can provide various different operating combinations. For example, by turning on the first transistor T1, so as to realize the forming operation of the RRAM cell, and by turning on the second transistor T2, so as to realize the data set/reset/read operations of the RRAM cell; or, the first transistor T1 is used for the forming/set operations of the RRAM cell, and the second transistor 12 is used for the data reset/read operations of the RRAM cell; or, the first transistor T1 is used for the forming/reset operations of the RRAM cell, and the second transistor T2 is used for the data set/read operations of the RRAM cell, etc. That is, another outstanding advantage of the 2T1R cell structure proposed by the present invention is the operation modes are flexible and cell performances thereof are significantly improved.

Hereinafter, a fabrication method for a RRAM cell structure of the present invention is described in detail through specific implementations and in conjunction with accompanying drawings.

Figure 7:
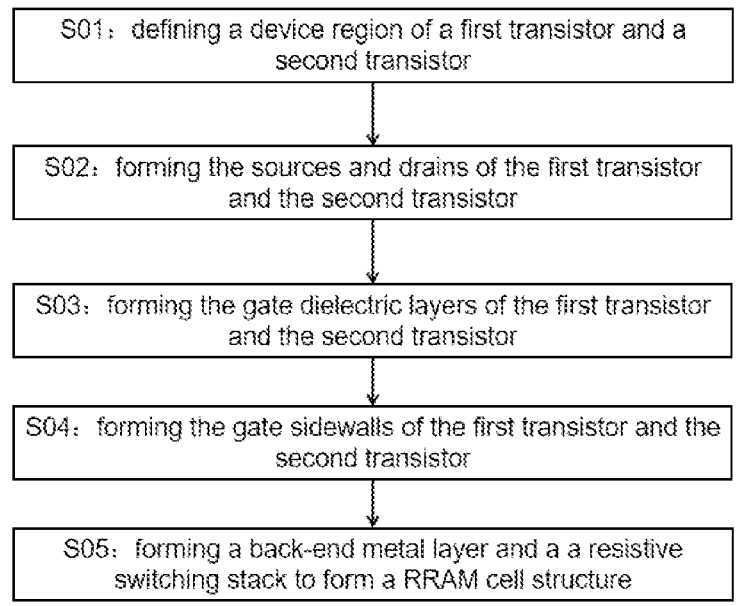
FIG. 7 is a flowchart of a fabrication method for a RRAM cell according to a preferred embodiment of the present invention.

Please refer to FIG. 7, which is a flowchart of a fabrication method for a RRAM cell according to a preferred embodiment of the present invention; meanwhile, please refer to FIG. 8-12, which are schematic cross-sectional views according to the preferred method of FIG. 7. As shown in FIG. 7, the method for fabricating the RRAM cell structure of the present invention can be used for forming the above-mentioned RRAM cell structure as shown in FIG. 4, and can comprise following steps:

S01: defining a device region of a first transistor and a second transistor.

Figure 8:
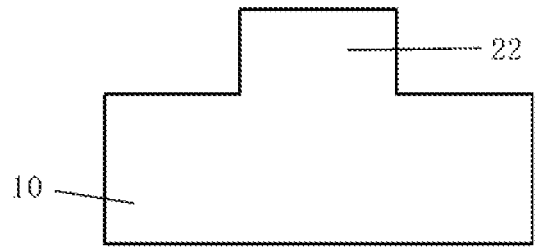
FIG. 8-12 are schematic cross-sectional views according to the preferred method of FIG. 7.

As shown in FIG. 8, first, providing the planar silicon substrate 10, though lithography and etching of a standard process in CMOS technique, defining the device region of the first transistor T1 and the second transistor T2 on the silicon substrate 10, and forming the raised cuboid 22 on the silicon substrate 10 in the device region.

S02: forming the sources and drains of the first transistor and the second transistor.

Figure 9:
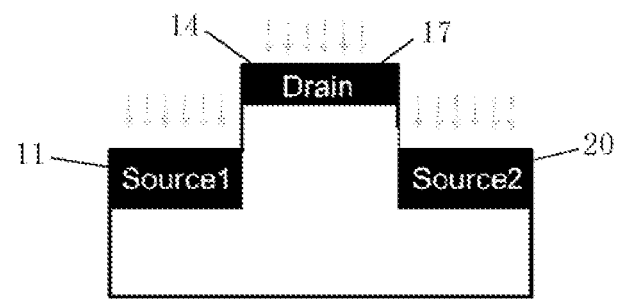

As shown in FIG. 9, then, though ion implantation of the standard processes in the CMOS technique, forming the common drain (that is, the first drain 14 connected with the second drain 17) of the first transistor T1 and the second transistor T2 on the top surface of the raised cuboid 22; and the first source 11 of the first transistor T1 and the second source 20 of the second transistor T2 are respectively formed on the silicon substrate 10 on each of the two sides of the raised cuboid 22.

In specific implementation, according to the different characteristic requirements of the first transistor T1 and the second transistor T2, combined with the lithography, respectively performing ion implantation processes with different types and doses to the first transistor T1 and the second transistor T2, which means respectively performing the ion implantation processes with different types and doses to the first drain 14 and the second drain 17, the first source 11 and the second source 20.

S03: forming the gate dielectric layers of the first transistor and the second transistor.

Figure 10:
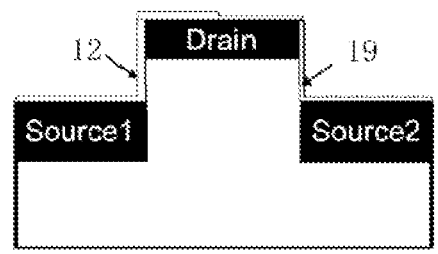

As shown in FIG. 10, first, a thick gate dielectric layer is deposited entirely on the surface of the silicon substrate 10, that is, the thick gate dielectric layer is deposited on the top surface and both sides of the raised cuboid 22 and on the surface of the semiconductor substrate 10 on each of the two sides of the raised cuboid 22. Second, by lithography and the etching, removing the thick gate dielectric layer in the region of the second transistor T2 where a thin gate dielectric layer needs to be formed. Finally, the thin gate dielectric layer is deposited entirely on the surface of the silicon substrate 10, that is, the thin gate dielectric layer is deposited on the top surface and both sides of the raised cuboid 22, and on the surface of the silicon substrate 10 on each of the two sides of the raised cuboid 22. Thereby, the first gate dielectric layer 12 (the thick gate dielectric layer) of the first transistor T1 and the second gate dielectric layer 19 (the thin gate dielectric layer) are respectively formed on each of the two sides of the raised cuboid 22 and on the surface of the silicon substrate 10 on each of the two sides of the raised cuboid 22.

In specific implementation, according to the device characteristic requirements, a thermal oxidation process or an atomic layer deposition (ALD) process can be used for forming the gate dielectric layer.

S04: forming sidewall gates of the first transistor and the second transistor.

Figure 11:
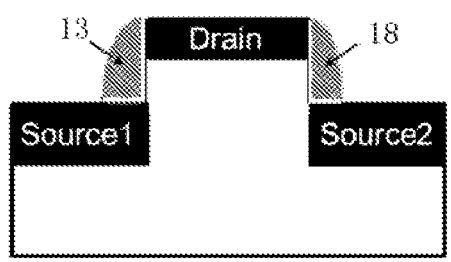

As shown in FIG. 11, next, forming the first gate 13 and the second gate 18 by a standard self-aligned sidewall process in the CMOS technique which comprising gate material deposition and sidewall etching, etc. Therefore, the first gate 13 of the first transistor T1 and the second gate 18 of the second transistor T2 are respectively formed on the first gate dielectric layer 12 and the second gate dielectric layer 19 on each of the two sides of the raised cuboid 22.

Standard ion implantation processes in the CMOS technique can be used to respectively perform ion implantation processes with different types and doses on the first gate 13 and the second gate 18.

S05: forming back-end metal layers and a resistive switching stack to form a 2T1R cell structure.

Figure 12:
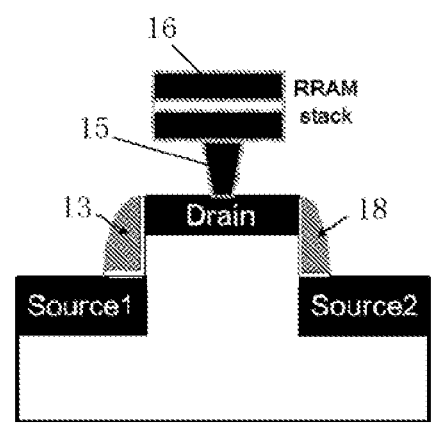

As shown in FIG. 12, finally, a dielectric layer is formed on the silicon substrate 10, current mainstream RRAM process technology can be used to prepare the resistive switching stack in the dielectric layer above the first drain 14 and the second drain 17, by the back-end interconnection process of the standard process in the CMOS technique to form the back-end metal layers, and realize connection of the resistive switching stack with the first transistor T1 and the second transistor T2 through the contact hole 15, so as to finally form the 2T1R type RRAM cell structure.

The resistive switching device 16 adopts a standard "top electrode-resistive switching layer-bottom electrode" sandwich resistive switching stack, the materials of the upper and bottom electrodes can be selected from conductive materials compatible with the CMOS technology, such as Ta, Ti, Cu, W, Pt, TaN or TiN, etc., and the material of the resistive layer can also be a dielectric material compatible with the CMOS technology, such as $TaO_x$, $HfO_x$ or $TiO_x$ (X is conventionally determined).

It can be seen that the above-mentioned fabrication method is completely compatible with the standard processes in the CMOS technique and the mainstream RRAM processes, which fully reflects the feasibility of the present invention.

In summary, the present invention proposes a 2T1R type RRAM cell structure, which comprises two parallel-connected transistors and a resistive switching device, the two transistors have different electrical characteristics and can be turn on according to different operating voltage requirements, thus the transistors can effectively take into account the different voltage requirements between the various operation modes of the resistance change cell, which has a very flexible operation mode, so as to realize a significant improvement in the performances of the RRAM cell. Meanwhile, a fabrication method for a 2T1R cell structure is completely on the basis of a standard process in the CMOS technique and a mainstream RRAM process, the two transistors are realized by two vertical channel transistors with side wall gates, and cell area thereof in layout is equivalent to cell area of a traditional 1T1R cell. Therefore, the outstanding advantages of the present invention are embodied in optimization and improvement of performances of the RRAM cell without increasing the cell area thereof, and the process implementation method therefor is compatible with existing standard processes, which is very suitable for future large-scale RRAM array and chip implementation, and is a new type of RRAM technology with very application prospects.

The above descriptions are only the preferred embodiments of the present invention, and the described embodiments are not used to limit the scope of patent protection of the present invention. Therefore, any equivalent structural changes made using the contents of the description and drawings of the present invention should be included in the same reasoning within the protection scope of the appended claims of the present invention.

What is claimed is:

1. A resistive random-access memory (RRAM) cell structure, comprising a first transistor and a second transistor which are connected in parallel and a resistive switching device connected with the first transistor and the second transistor commonly; wherein, the first transistor is set with a first gate, a first source and a first drain, a first control signal is applied to the first gate, and a first source signal is applied to the first source;

the second transistor is set with a second gate, a second source and a second drain, a second control signal is applied to the second gate, and a second source signal is applied to the second source;

the first drain is connected with the second drain, which are commonly connected to one terminal of the resistive switching device, and a bit signal is applied to another terminal of the resistive switching device;

the RRAM cell structure is set on a semiconductor substrate, a raised cuboid is set on the surface of the semiconductor substrate, the first drain and the second drain are set on the top surface of the raised cuboid, the first gate and the second gate are respectively set on the two sidewalls of the raised cuboid, and the first source and the second source are respectively set on the semiconductor substrate adjacent to the two sides of the raised cuboid, a first gate dielectric layer and a second gate dielectric layer are respectively set to separate the first gate and the second gate from the semiconductor substrate; the first transistor is set with a first channel, the second transistor is set with a second channel, the first channel and the second channel are commonly set in the raised cuboid to respectively form a vertical channel structure; a dielectric layer is set on the surface of the semiconductor substrate, and the resistive switching device is set in the dielectric layer; and the thicknesses of the first gate dielectric layer and the second gate dielectric layer are different, the types and doses of the ion implantations of the first transistor and the second transistor are different.

2. The RRAM cell structure of claim 1, wherein the first transistor and the second transistor in layout is equivalent to a planar MOS transistor; wherein, the first source and the second source in layout is equivalent to the source and drain of the planar MOS transistor, and the first drain and the second drain in layout is equivalent to the gate of the planar MOS transistor, the first gate and the second gate are corresponding to the two gate sidewalls of the planar MOS transistor.

3. The RRAM cell structure of claim 1, wherein the resistive switching device comprises a resistive switching stack, which comprises a top electrode, a resistive switching layer and a bottom electrode in sequence, the first drain and the second drain are connected to the bottom electrode of the resistive switching device through a contact hole set in the dielectric layer, and the bit signal is applied to the top electrode of the resistive switching device.

4. The RRAM cell structure of claim 1, wherein the first transistor is used for the forming operation of the RRAM cell, and the second transistor is used for the data set/reset/read operations of the RRAM cell; or, the first transistor is used for the forming/set operations of the RRAM cell, and the second transistor is used for the data reset/read operations of the RRAM cell, or, the first transistor is used for the forming/reset operations of the RRAM cell, and the second transistor is used for the data set/read operations of the RRAM cell.

5. A fabrication method for a resistive random-access memory (RRAM) cell structure, wherein the RRAM cell structure comprises a first transistor and a second transistor which are connected in parallel and a resistive switching device connected with the first transistor and the second transistor commonly; wherein, the first transistor is set with a first gate, a first source and a first drain, a first control signal is applied to the first gate, and a first source signal is applied to the first source;

the second transistor is set with a second gate, a second source and a second drain, a second control signal is applied to the second gate, and a second source signal is applied to the second source;

the first drain is connected with the second drain, which are commonly connected to one terminal of the resistive switching device, and a bit signal is applied to another terminal of the resistive switching device, the fabrication method comprising:

S1: providing a planar silicon substrate, defining a device region of the first transistor and the second transistor on the silicon substrate, and forming a raised cuboid on the silicon substrate in the device region;

S2: forming the first drain of the first transistor and the second drain of the second transistor on the top surface of the raised cuboid, connecting the first drain and the second drain, and forming the first source of the first transistor and the second source of the second transistor respectively on the semiconductor substrate adjacent to the two sides of the raised cuboid;

S3: forming the first gate dielectric layer of the first transistor and the second gate dielectric layer of the second transistor respectively on each of the two sides of the raised cuboid and the surface of the semiconductor substrate adjacent to the two sides of the raised cuboid;

S4: forming a first sidewall gate of the first transistor and a second sidewall gate of the second transistor respectively on the first gate dielectric layer and the second gate dielectric layer on each of the two sides of the raised cuboid; and S5: forming a dielectric layer on the silicon substrate, forming back-end metal layers in the dielectric layer, and forming a resistive switching stack of a resistive switching device above the first drain and the second drain, thus forming the RRAM cell structure;

wherein, using a standard ion implantation process in CMOS technique, performing ion implantation processes with different types and doses to the first drain and the second drain, the first source and the second source and the first gate and the second gate respectively.

6. The fabrication method of claim 5, wherein, in S4: using a standard self-aligned sidewall process in CMOS technique comprising a gate material deposition process and a sidewall etching process to form the first gate and the second gate.

7. A fabrication method for a resistive random-access memory (RRAM) cell structure, wherein the RRAM cell structure comprises a first transistor and a second transistor which are connected in parallel and a resistive switching device connected with the first transistor and the second transistor commonly; wherein, the first transistor is set with a first gate, a first source and a first drain, a first control signal is applied to the first gate, and a first source signal is applied to the first source;

the second transistor is set with a second gate, a second source and a second drain, a second control signal is applied to the second gate, and a second source signal is applied to the second source;

the first drain is connected with the second drain, which are commonly connected to one terminal of the resistive switching device, and a bit signal is applied to another terminal of the resistive switching device, the fabrication method comprising:

S1: providing a planar silicon substrate, defining a device region of the first transistor and the second transistor on the silicon substrate, and forming a raised cuboid on the silicon substrate in the device region;

S2: forming the first drain of the first transistor and the second drain of the second transistor on the too surface of the raised cuboid, connecting the first drain and the second drain, and forming the first source of the first transistor and the second source of the second transistor respectively on the semiconductor substrate adjacent to the two sides of the raised cuboid;

S3: forming the first gate dielectric layer of the first transistor and the second gate dielectric layer of the second transistor respectively on each of the two sides of the raised cuboid and the surface of the semiconductor substrate adjacent to the two sides of the raised cuboid;

S4: forming a first sidewall gate of the first transistor and a second sidewall Pate of the second transistor respectively on the first gate dielectric layer and the second gate dielectric layer on each of the two sides of the raised cuboid; and S5: forming a dielectric layer on the silicon substrate, forming back-end metal layers in the dielectric layer, and forming a resistive switching stack of a resistive switching device above the first drain and the second drain, thus forming the RRAM cell structure;

wherein, forming the first gate dielectric layer and the second gate dielectric layer comprises:

S31: forming a thick gate dielectric layer on the top surface and both sides of the raised cuboid and on the surface of the semiconductor substrate adjacent to the two sides of the raised cuboid;

S32: removing the thick gate dielectric layer on the second transistor;

S33: forming a thin gate dielectric layer on the top surface and both sides of the raised cuboid and on the surface of the semiconductor substrate adjacent to the two sides of the raised cuboid.

\* \* \* \* \*